US012627518B2

(12) United States Patent
Huang et al.

(10) Patent No.: US 12,627,518 B2
(45) Date of Patent: May 12, 2026

(54) POWERED DEVICE FOR POWER OVER ETHERNET, POWER OVER ETHERNET SYSTEM, AND OPERATING METHOD THEREOF

(71) Applicant: Zyxel Networks Corporation, New Taipei City (TW)

(72) Inventors: Chung-Hsien Huang, Hsinchu City (TW); Yueh-O Tseng, Hsinchu City (TW)

(73) Assignee: Zyxel Networks Corporation, New Taipei City (TW)

( * ) Notice: Subject to any disclaimer, the term of this patent is extended or adjusted under 35 U.S.C. 154(b) by 147 days.

(21) Appl. No.: 18/818,645

(22) Filed: Aug. 29, 2024

(65) Prior Publication Data

US 2025/0267021 A1 Aug. 21, 2025

(30) Foreign Application Priority Data

Feb. 21, 2024 (TW) ................................. 113106063

(51) Int. Cl.
*H04L 12/10* (2006.01)
*G06F 1/26* (2006.01)

(52) U.S. Cl.
CPC .............. *H04L 12/10* (2013.01); *G06F 1/266* (2013.01)

(58) Field of Classification Search
CPC ...................................... G06F 1/12; G06F 9/44
See application file for complete search history.

(56) References Cited

U.S. PATENT DOCUMENTS

| | | | | |
|---|---|---|---|---|
| 2010/0049998 A1* | 2/2010 | Karam | .................... | H04L 12/10 |
| | | | | 713/300 |
| 2020/0159307 A1* | 5/2020 | Roy | ....................... | G06F 1/3209 |
| 2020/0274724 A1* | 8/2020 | Rosenthal | ............. | G06F 1/3206 |

FOREIGN PATENT DOCUMENTS

| | | |
|---|---|---|
| CN | 105379044 | 6/2019 |
| TW | 202206828 | 2/2022 |

OTHER PUBLICATIONS

"Office Action of Taiwan Counterpart Application", issued on Oct. 17, 2024, p. 1-p. 8.

* cited by examiner

*Primary Examiner* — Keshab R Pandey
(74) *Attorney, Agent, or Firm* — JCIPRNET

(57) ABSTRACT

A powered device (PD) for Power over Ethernet (PoE), a PoE system, and an operating method for PoE are provided. The powered device includes a first Ethernet transmission port, a second Ethernet transmission port, a power meter, and a controller. The first Ethernet transmission port receives a first power and a first packet from a power sourcing equipment (PSE). The first packet includes a first output voltage value and a first maximum allowable power value. The second Ethernet transmission port provides a second power to a next-level powered device. The power meter measures an input voltage value and an input current value of the powered device. The controller sends a second packet to the next-level powered device via the second Ethernet transmission port. The second packet includes a second output voltage value and a second maximum allowable power value.

18 Claims, 7 Drawing Sheets

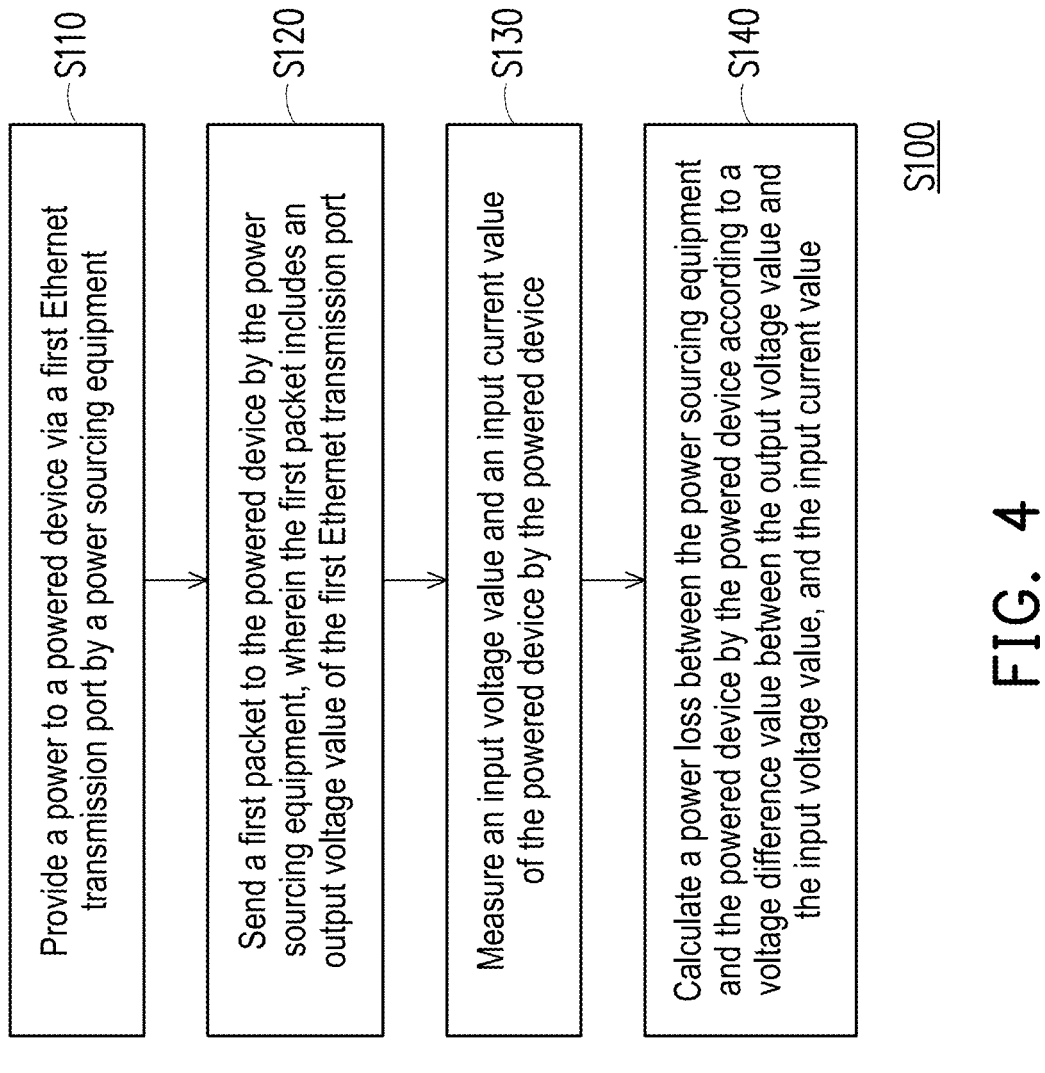

S110

Provide a power to a powered device via a first Ethernet transmission port by a power sourcing equipment

S120

Send a first packet to the powered device by the power sourcing equipment, wherein the first packet includes an output voltage value of the first Ethernet transmission port

S130

Measure an input voltage value and an input current value of the powered device by the powered device

S140

Calculate a power loss between the power sourcing equipment and the powered device by the powered device according to a voltage difference value between the output voltage value and the input voltage value, and the input current value

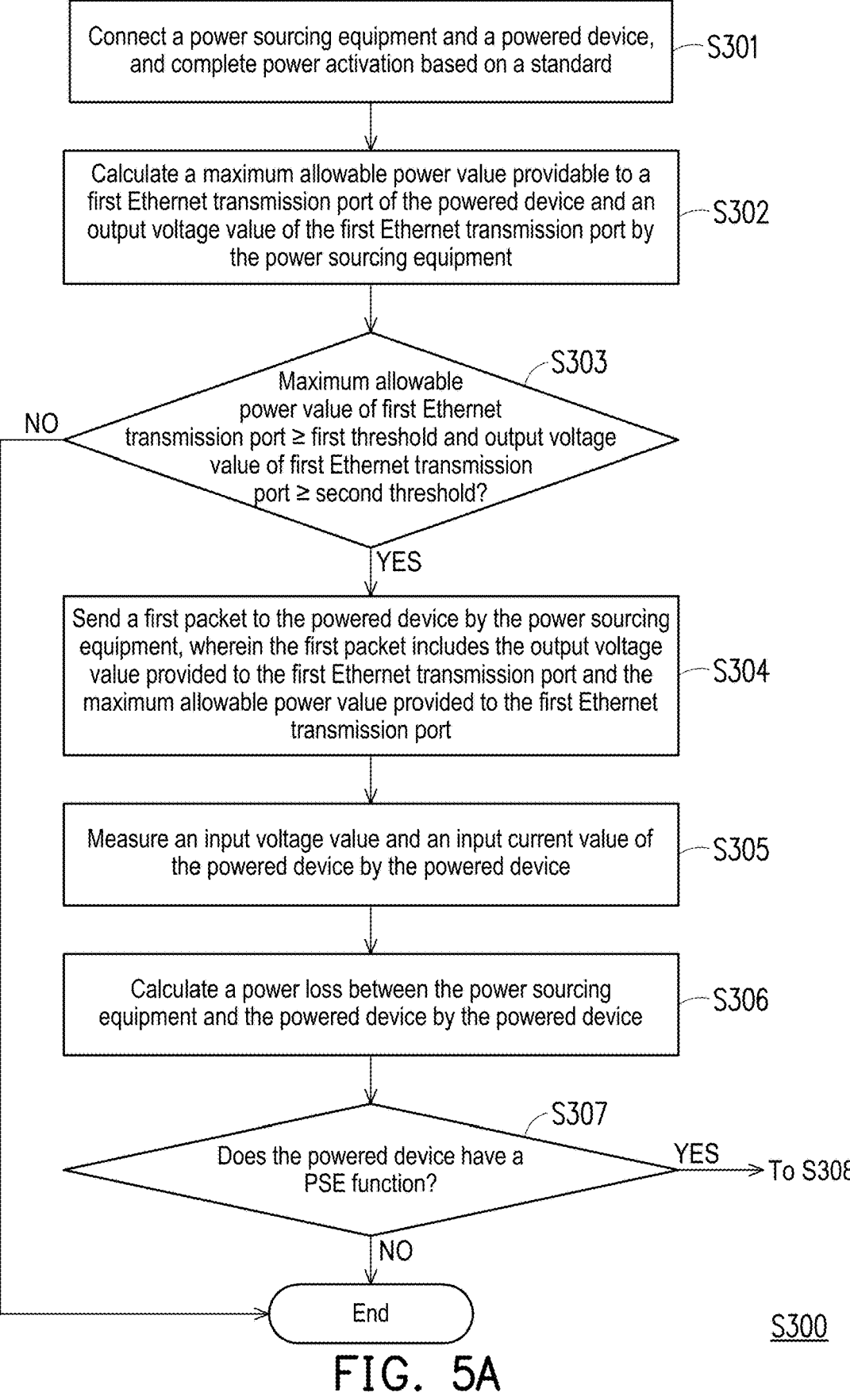

Connect a power sourcing equipment and a powered device, and complete power activation based on a standard —S301

Calculate a maximum allowable power value providable to a first Ethernet transmission port of the powered device and an output voltage value of the first Ethernet transmission port by the power sourcing equipment —S302

S303
Maximum allowable power value of first Ethernet transmission port ≥ first threshold and output voltage value of first Ethernet transmission port ≥ second threshold?

NO

YES

Send a first packet to the powered device by the power sourcing equipment, wherein the first packet includes the output voltage value provided to the first Ethernet transmission port and the maximum allowable power value provided to the first Ethernet transmission port —S304

Measure an input voltage value and an input current value of the powered device by the powered device —S305

Calculate a power loss between the power sourcing equipment and the powered device by the powered device —S306

S307
Does the powered device have a PSE function?

YES → To S308

NO

End

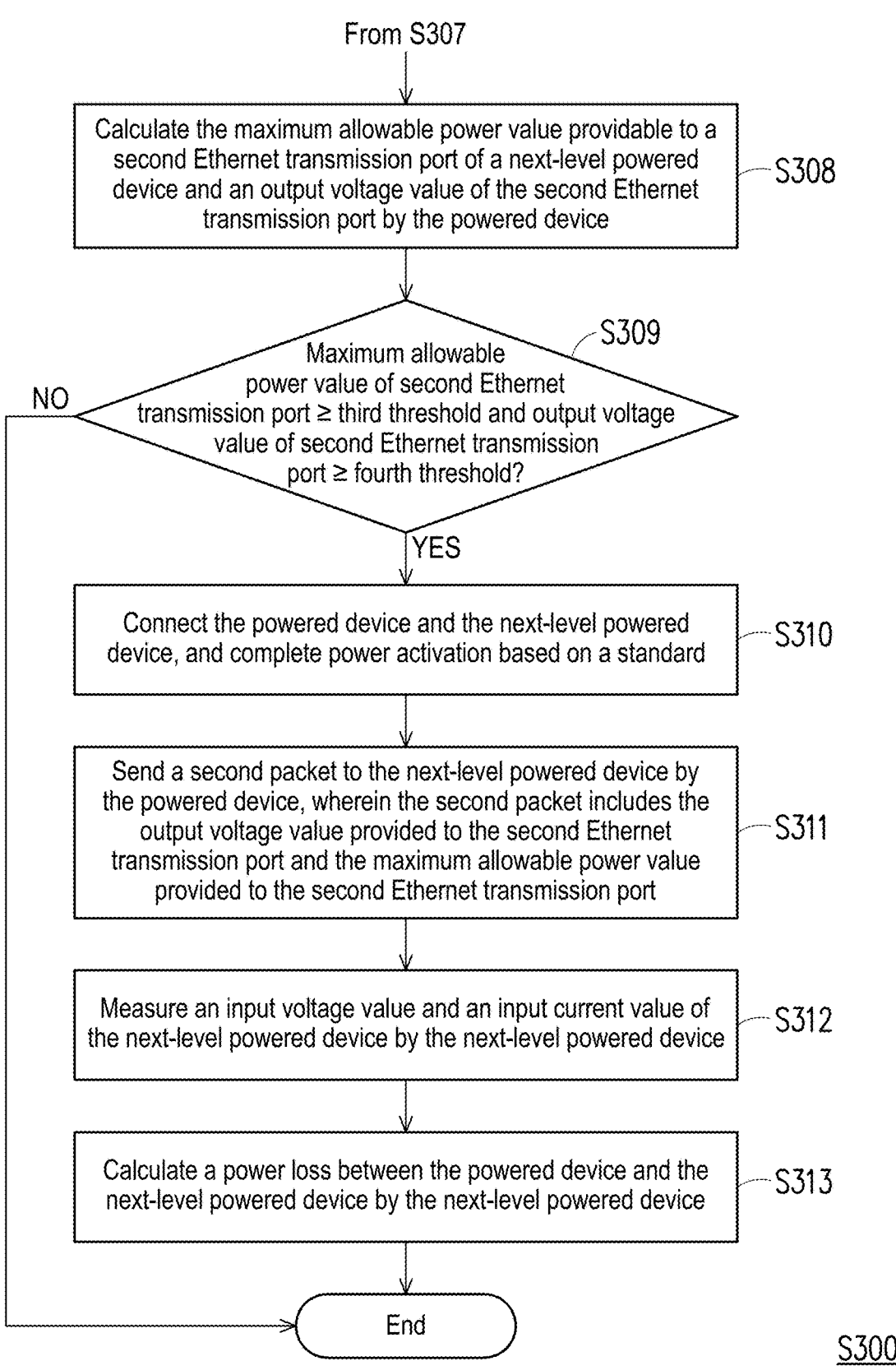

From S307

Calculate the maximum allowable power value providable to a second Ethernet transmission port of a next-level powered device and an output voltage value of the second Ethernet transmission port by the powered device — S308

S309 — Maximum allowable power value of second Ethernet transmission port ≥ third threshold and output voltage value of second Ethernet transmission port ≥ fourth threshold?

NO

YES

Connect the powered device and the next-level powered device, and complete power activation based on a standard — S310

Send a second packet to the next-level powered device by the powered device, wherein the second packet includes the output voltage value provided to the second Ethernet transmission port and the maximum allowable power value provided to the second Ethernet transmission port — S311

Measure an input voltage value and an input current value of the next-level powered device by the next-level powered device — S312

Calculate a power loss between the powered device and the next-level powered device by the next-level powered device — S313

End

POWERED DEVICE FOR POWER OVER ETHERNET, POWER OVER ETHERNET SYSTEM, AND OPERATING METHOD THEREOF

CROSS-REFERENCE TO RELATED APPLICATION

This application claims the priority benefit of Taiwan application serial no. 113106063, filed on Feb. 21, 2024. The entirety of the above-mentioned patent application is hereby incorporated by reference herein and made a part of this specification.

BACKGROUND

Technical Field

The disclosure relates to a powered device, a power supply network system, and an operating method for the power supply network, and in particular to a powered device for Power over Ethernet, a Power over Ethernet system, and an operating method for Power over Ethernet.

Description of Related Art

Generally speaking, in a Power over Ethernet (PoE) system, a power sourcing equipment (PSE) may communicate with a powered device (PD) based on a protocol defined in Power over Ethernet standard (for example, IEEE standard 802.3af/at/bt) to determine a power consumption value provided to the powered device, and provide power to the powered device according to the power consumption value. However, in the case where the number of powered devices increases or the Power over Ethernet system has a larger power demand, the power consumption of a cable between the power sourcing equipment and the powered device is more significant. There will be a difference between the power consumption value determined by the above-mentioned protocol and the actual power consumption value. Therefore, the power consumption value determined by the protocol may not be accurate, causing that the power provided by the Power over Ethernet system is not fully utilized.

SUMMARY

The disclosure provides a powered device for Power over Ethernet, a Power over Ethernet system, and an operating method for Power over Ethernet. The powered device, the Power over Ethernet system, and the operating method can obtain accurate power consumption.

A powered device of the disclosure includes a first Ethernet transmission port, a second Ethernet transmission port, a power meter, and a controller. The first Ethernet transmission port is coupled to a power sourcing equipment. The first Ethernet transmission port receives a first power and a first packet from the power sourcing equipment. The first packet includes a first output voltage value and a first maximum allowable power value. The second Ethernet transmission port is coupled to a next-level powered device. The second Ethernet transmission port provides a second power to the next-level powered device. The power meter measures an input voltage value and an input current value of the powered device. The controller sends a second packet to the next-level powered device via the second Ethernet transmission port. The second packet includes a second output voltage value and a second maximum allowable power value.

A Power over Ethernet system of the disclosure includes a power sourcing equipment and a powered device. The power sourcing equipment includes a first Ethernet transmission port and a first controller. The first controller is coupled to the first Ethernet transmission port and provides a power and sends a first packet via the first Ethernet transmission port. The first packet includes an output voltage value and a maximum allowable power value. The powered device includes a second Ethernet transmission port, a power meter, and a second controller. The second Ethernet transmission port is coupled to the first Ethernet transmission port. The second Ethernet transmission port receives the power and the first packet. The power meter measures an input voltage value and an input current value of the powered device. The second controller is coupled to the second Ethernet transmission port and the power meter. The second controller obtains an allowable power value of the powered device according to the output voltage value, the input voltage value, and the maximum allowable power value.

An operating method of the disclosure is used for a Power over Ethernet system. The Power over Ethernet system includes a power sourcing equipment and a powered device. The operating method comprises the following steps: a first power and a first packet are sent to the powered device by the power sourcing equipment, wherein the first packet includes a first output voltage value and a first maximum allowable power value; an input voltage value and an input current value of the powered device are measured by the powered device and an allowable power value of the powered device is obtained by the powered device according to the output voltage value, the input voltage value, and the maximum allowable power value.

BRIEF DESCRIPTION OF THE DRAWINGS

FIG. 4 is a flowchart of an operating method according to an embodiment of the disclosure.

FIG. 5A and FIG. 5B are flowcharts of an operating method according to an embodiment of the disclosure.

DESCRIPTION OF THE EMBODIMENTS

Figure 1:
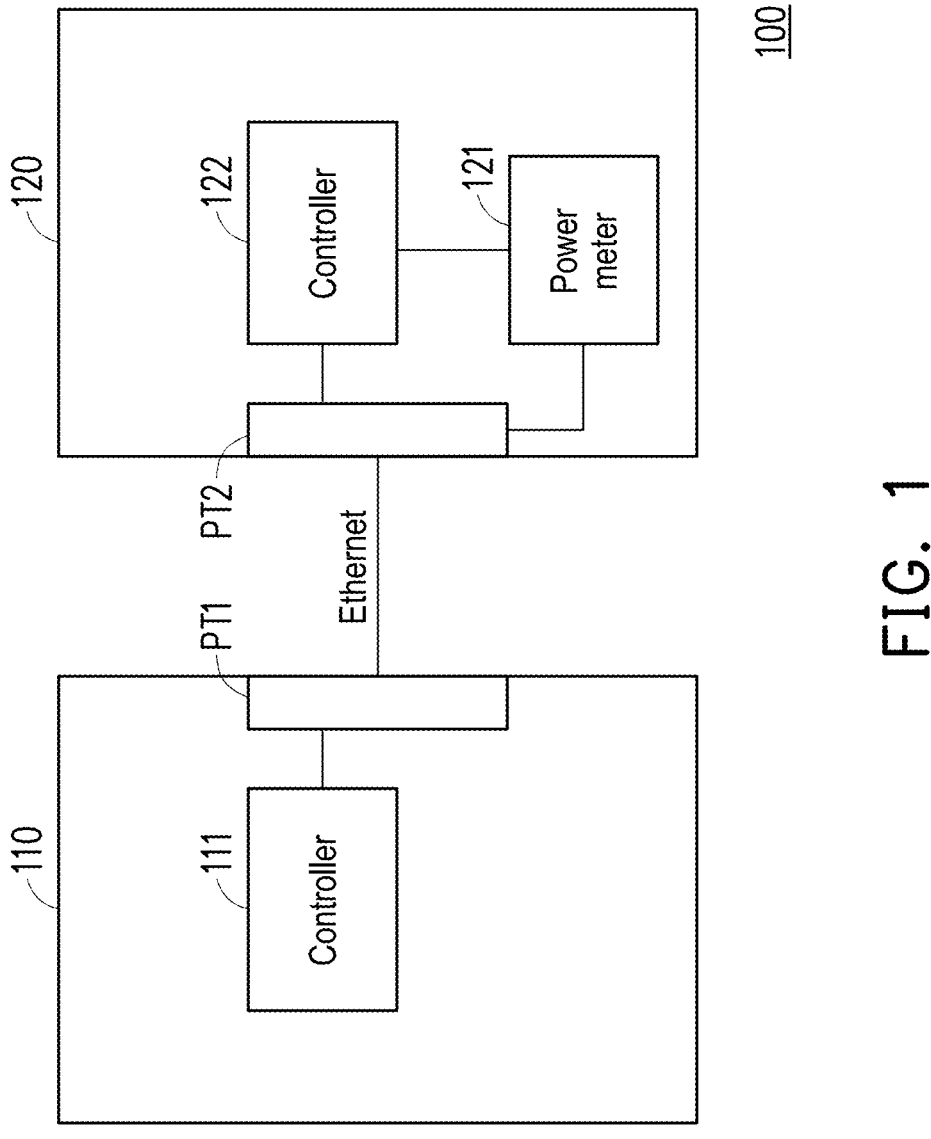
FIG. 1 is a schematic diagram of a Power over Ethernet system according to an embodiment of the disclosure.

Some embodiments of the disclosure will be described in detail with reference to the drawings. Reference numerals cited in the following description will be regarded as referring to the same or similar elements when the same reference numerals appear in different drawings. The embodiments are only a part of the disclosure and do not disclose all possible implementations of the disclosure. Specifically, the embodiments are only examples within the protection scope of the disclosure.

FIG. 1 is a schematic diagram of a Power over Ethernet system according to an embodiment of the disclosure. In the embodiment, a Power over Ethernet system 100 includes a power sourcing equipment 110 and a powered device 120.

The power sourcing equipment 110 may communicate with the powered device 120 using an Ethernet Power over Ethernet standard (for example, IEEE standard 802.3af/at/bt). The power sourcing equipment 110 includes an Ethernet transmission port PT1 and a controller 111. The controller 111 is coupled to the Ethernet transmission port PT1. The power sourcing equipment 110 provides a power and sends a first packet to the powered device 120 via the Ethernet transmission port PT1. In the embodiment, the first packet includes an output voltage value of the Ethernet transmission port PT1 and a maximum allowable power value that the powered device 120 is allowed to use.

In the embodiment, the powered device 120 includes an Ethernet transmission port PT2, a power meter 121, and a controller 122. The Ethernet transmission port PT2 is coupled to the Ethernet transmission port PT1. The Ethernet transmission port PT2 is connected to the Ethernet transmission port PT1 via an Ethernet connection cable. The Ethernet transmission port PT2 receives the power and the first packet from the power sourcing equipment 110. The power meter 121 measures an input voltage value and an input current value received by the powered device 120 via the Ethernet transmission port PT2.

In the embodiment, the controller 122 is coupled to the Ethernet transmission port PT2 and the power meter 121. The controller 122 receives the first packet, and obtains an allowable power value of the powered device 120 according to the output voltage value of the power sourcing equipment 110, the input voltage value of the powered device 120, and the maximum allowable power value of the powered device 120 (that is, the maximum allowable power value that the power sourcing equipment 110 can provide).

It is worth mentioning here that the controller 122 of the powered device 120 can accurately calculate the actually allowable power value of the powered device 120 according to the output voltage value provided by the power sourcing equipment 110, the input voltage value of the powered device 120, and the maximum allowable power value allowed for the powered device 120.

In the embodiment, the controller 122 may calculate the allowable power value of the powered device 120 according to Equation (1) shown below.

$$PWR2 = PWR1 - ((V_{out} - V_{in}) \times I_{in}) \qquad \text{Equation (1)}$$

"PWR2" is the allowable power value of the powered device 120. "PWR1" is the maximum allowable power value that the power sourcing equipment 110 can provide. "$V_{out}$" is the output voltage value of the power sourcing equipment 110. "$V_{in}$" is the input voltage value of the powered device 120. "$I_{in}$" is the input current value of the powered device 120. "$(V_{out}-V_{in}) \times I_{in}$" is an actual power loss between the power sourcing equipment 110 and the powered device 120, including, for example, a transmission power loss of a connection cable and a power loss consumed by the device itself.

It is worth mentioning here that the controller 122 can obtain the actual remaining power allowable for the powered device 120 after the power sourcing equipment 110 and the powered device 120 are connected via a cable because the allowable power value of the powered device 120 is a result obtained by considering the actual power loss.

For example, based on the first packet, the controller 122 may know that the maximum allowable power value that the power sourcing equipment 110 can provide is 90 watts, and know that the output voltage value of the power sourcing equipment 110 is 52 volts. The power meter 121 measures that the input voltage value received by the powered device 120 is 46.6 volts, and the input current value is 0.35 amps. Therefore, based on Equation (1), the controller 122 may determine that the actual power loss (including the transmission power loss and the power loss consumed by the powered device 120 itself) is equal to 1.89 watts, and the actually allowable power value of the powered device 120 is equal to 88.11 watts.

In addition, the controller 111 calculates the maximum allowable power value that the power sourcing equipment 110 can provide to the powered device 120 and obtains the output voltage value at the Ethernet transmission port PT1. The controller 111 compares the values of the maximum allowable power value provided to the powered device 120 and the output voltage value at the Ethernet transmission port PT1 with corresponding thresholds. When the maximum allowable power value provided to the powered device 120 is determined to be higher than or equal to a first threshold and the output voltage value of the Ethernet transmission port PT1 is determined to be higher than or equal to a second threshold, this indicates that the maximum allowable power value and the output voltage value are both sufficient. Therefore, the controller 111 sends the first packet to the powered device 120. For example, the first threshold may be a pre-defined allowable power value of the powered device 120, such as 4 watts. The second threshold may be a minimum input voltage value of the Ethernet transmission port of the powered device 120, such as 37 volts.

On the other hand, when the maximum allowable power value provided to the powered device 120 is lower than the first threshold and/or the output voltage value is lower than the second threshold, this indicates that the maximum allowable power value provided to the powered device 120 and/or the output voltage value is insufficient. Therefore, the controller 111 stops sending the first packet.

Figure 2:
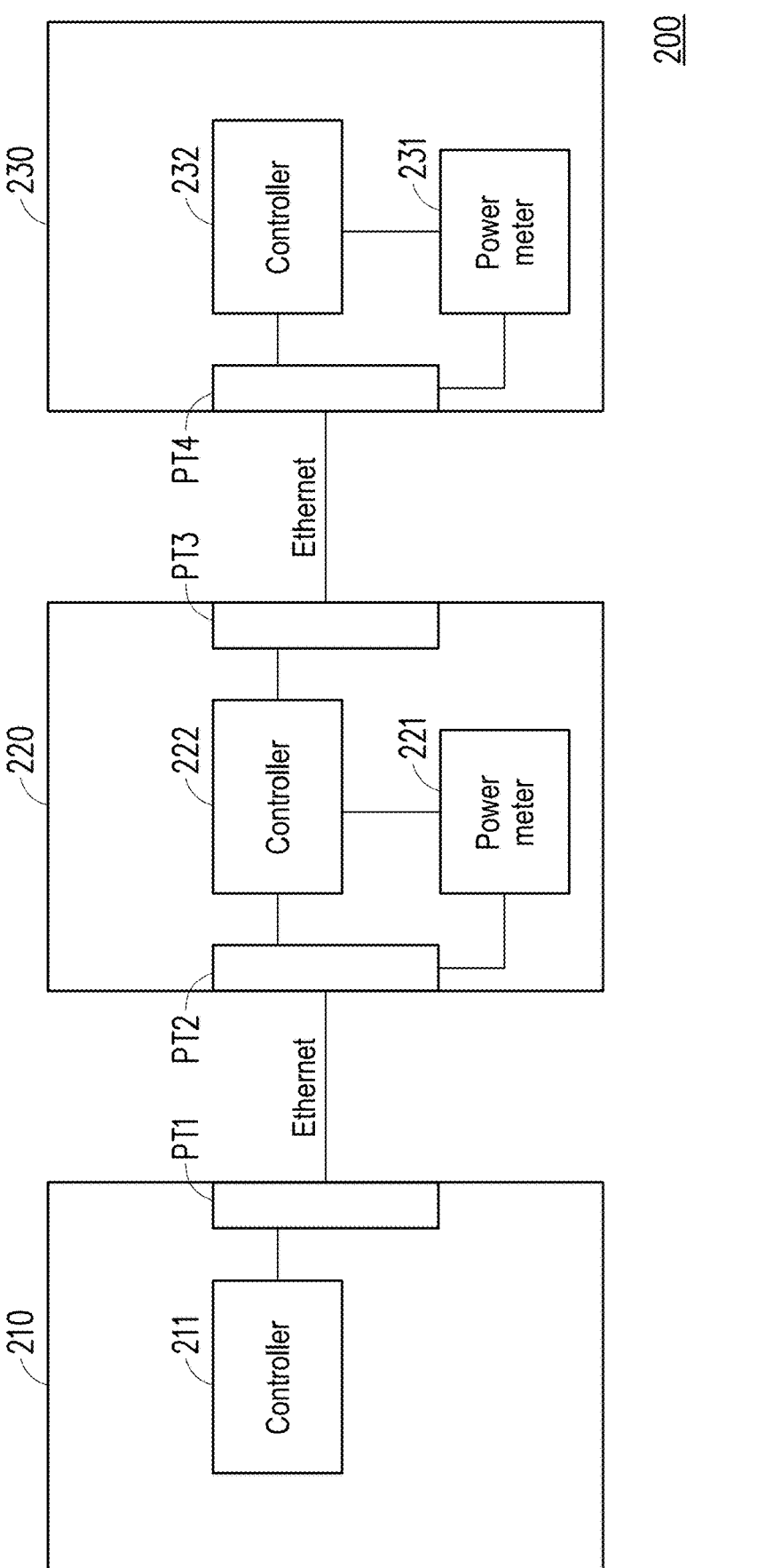
FIG. 2 is a schematic diagram of a Power over Ethernet system according to an embodiment of the disclosure.

FIG. 2 is a schematic diagram of a Power over Ethernet system according to an embodiment of the disclosure. In the embodiment, a Power over Ethernet system 200 includes a power sourcing equipment 210 and powered devices 220 and 230. The power sourcing equipment 210 may communicate with the powered device 220 via a Power over Ethernet standard. The power sourcing equipment 210 includes an Ethernet transmission port PT1 and a controller 211. The controller 211 is coupled to the Ethernet transmission port PT1. The controller 211 provides a first power and sends a first packet to the powered device 220 via the Ethernet transmission port PT1. In the embodiment, the first packet includes a first output voltage value corresponding to the Ethernet transmission port PT1 of the power sourcing equipment 210 and a first maximum allowable power value provided by the power sourcing equipment 210.

In the embodiment, the powered device 220 includes Ethernet transmission ports PT2 and PT3, a power meter 221, and a controller 222. The Ethernet transmission port PT2 is coupled to the power sourcing equipment 210. The Ethernet transmission port PT2 receives the first power and the first packet from the power sourcing equipment 210. The Ethernet transmission port PT3 is coupled to the powered device 230 (that is, the next-level powered device). The controller 222 provides a second power and sends a second packet to the powered device 230 via the Ethernet transmission port PT3.

The power meter 221 measures an input voltage value and an input current value received by the powered device 220. The controller 222 sends the second packet to the next-level powered device via the Ethernet transmission port PT3. The second packet includes a second output voltage value corresponding to the Ethernet transmission port PT3 of the powered device 220 and a second maximum allowable power value provided by the powered device 220.

The powered device 230 includes an Ethernet transmission port PT4, a power meter 231, and a controller 232. The Ethernet transmission port PT4 is coupled to the powered device 220. The Ethernet transmission port PT4 receives the second power and the second packet from the powered device 220. The power meter 231 measures an input voltage value and an input current value received by the powered device 230.

The controller 232 receives the second packet, and obtains an allowable power value of the powered device 230 according to the second output voltage value of the powered device 220, the input voltage value of the powered device 230, and the second maximum allowable power value that the powered device 220 can provide.

In the embodiment, the controller 222 may calculate the allowable power value, that is, the remaining allowable power of the powered device 220 according to Equation (2) shown below.

$$PWR4 = PWR3 - ((V_{out1} - V_{in2}) \times I_{in2}) \qquad \text{Formula (2)}$$

"PWR4" is the allowable power value of the powered device 220. "PWR3" is the maximum allowable power value that the power sourcing equipment 210 can provide. "$V_{out1}$" is the output voltage value of the power sourcing equipment 210. "$V_{in2}$" is the input voltage value of the powered device 220. "$I_{in2}$" is the input current value of the powered device 220. "$(V_{out1}-V_{in2}) \times I_{in2}$" is an actual power loss between the power sourcing equipment 210 and the powered device 220, including, for example, a transmission power loss of a connection cable and a power loss consumed by the device itself. Here, the controller 222 can obtain the actually remaining power allowable for the powered device 220 after the power sourcing equipment 210 and the powered device 220 are connected via a cable because the allowable power value of the powered device 220 is a result obtained by considering the actual power loss of the connection cable.

In the embodiment, the controller 232 may calculate the allowable power value, that is, the remaining allowable power of the powered device 230 according to Equation (3) shown below.

$$PWR6 = PWR5 - ((V_{out2} - V_{in3}) \times I_{in3}) \qquad \text{Formula (3)}$$

"PWR6" is the allowable power value of the powered device 230. "PWR5" is the maximum allowable power value that the powered device 220 can provide. "$V_{out2}$" is the output voltage value of the powered device 220. "$V_{in3}$" is the input voltage value of the powered device 230. "$I_{in3}$" is the input current value of the powered device 230. "$(V_{out2}-V_{in3}) \times I_{in3}$" is an actual power loss between the powered device 220 and the powered device 230, including, for example, a transmission power loss of a connection cable and a power loss consumed by the device itself. Here, the controller 232 can obtain the actually remaining power allowable for the powered device 230 after the powered device 220 and the powered device 230 are connected via a cable because the allowable power value of the powered device 230 is a result obtained by considering the actual power loss of the connection cable.

In an embodiment, when the total power of the power supply system of the power sourcing equipment 210 is insufficient, a power management mechanism may be activated. Specifically, when the abovementioned situation occurs, the power sourcing equipment 210 may send a packet to immediately notify the powered device 220 so that the powered device 220 may reduce the power loading in response to receiving the packet. The packet includes the output voltage value of the Ethernet transmission port PT1 of the power sourcing equipment 210 and an adjusted maximum allowable power value of the powered device 220. When the powered device 220 detects changes of the received maximum allowable power value, the powered device 220 can recalculate the allowable power for limiting its power loading and output. In addition, the powered device 220 may perform a same method as the power sourcing equipment 210 operates to notify the next-level powered device 230 for reducing the power loading.

Figure 3:
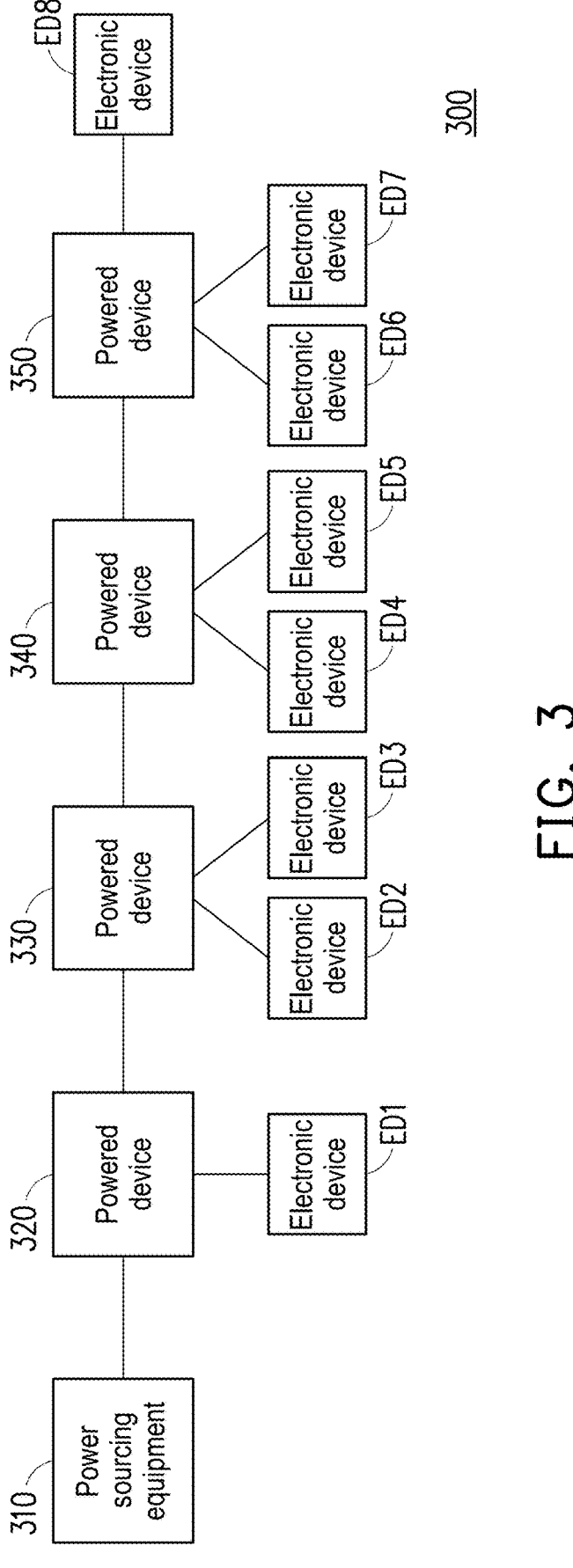
FIG. 3 is a schematic diagram of a Power over Ethernet system according to an embodiment of the disclosure.

FIG. 3 is a schematic diagram of a Power over Ethernet system according to an embodiment of the disclosure. In the embodiment, a Power over Ethernet system 300 includes a power sourcing equipment 310 and powered devices 320 to 350. The power sourcing equipment 310 may operate as the power sourcing equipment 110 shown in FIG. 1 or the power sourcing equipment 210 shown in FIG. 2. The powered devices 320 to 350 may individually operate as the powered device 220 shown in FIG. 2. The power sourcing equipment 310 and the powered devices 320 to 350 are coupled to each other in series by Ethernet transmission lines.

Taking the embodiment as an example, the power sourcing equipment 310 is coupled to the powered device 320 and supplies power to the powered device 320. The powered device 320 is coupled to the powered device 330 and an electronic device ED1. The powered device 320 may supply power to the powered device 330 and the electronic device ED1. The powered device 330 is coupled to the powered device 340 and electronic devices ED2 and ED3. The powered device 330 may supply power to the powered device 340 and the electronic devices ED2 and ED3. The powered device 340 is coupled to the powered device 350 and electronic devices ED4 and ED5. The powered device 340 may supply power to the powered device 350 and the electronic devices ED4 and ED5. The powered device 350 is coupled to electronic devices ED6, ED7, and ED8, and supplies power to the electronic devices ED6, ED7, and ED8.

The powered device 320 may calculate a power loss between the power sourcing equipment 310 and the powered device 320 and a power consumption value of the powered device 320. The powered device 330 may calculate a power loss between the powered device 320 and the powered device 330 and a power consumption value of the powered device 330, and so on. Therefore, the Power over Ethernet system 300 may determine or design an allowable cable length between the power sourcing equipment 310 and the powered devices 320 to 350 based on the power loss and the power consumption value of the powered devices. For example, the smaller the power loss or the power consumption value of the powered device is, the longer the allowable cable length between the power sourcing equipment 310 and the powered devices 320 to 350 may be. The greater the power loss or the power consumption value of the powered device is, the shorter the length of the allowable cable length between the power sourcing equipment 310 and the powered devices 320 to 350 may be.

In addition, the Power over Ethernet system 300 may determine or design the number of cascaded powered devices based on the power loss or the power consumption value of the powered device. For example, the smaller the power loss or the power consumption value of the powered device is, the greater the number of the cascaded powered devices may be. The greater the power loss or the power consumption value of the powered device is, the smaller the number of the cascaded powered devices may be.

In the embodiment, the electronic devices ED1 to ED8 are, for example, individually devices such as image capture devices (for example, IP cameras), notebook computers, smart phones, tablet computers, and chargers, etc., but the disclosure is not limited thereto. The number of electronic devices of the disclosure may be determined according to the maximum allowable power value of the power sourcing equipment 310, and the number of electronic devices of the disclosure is not limited to the embodiment.

FIG. 4 is a flowchart of an operating method according to an embodiment of the disclosure. In the embodiment, an operating method S100 is applicable to the Power over Ethernet system 100 in FIG. 1. The operating method S100 includes Steps S110 to S140. In Step S110, the power sourcing equipment 110 provides a power to the powered device 120 via the Ethernet transmission port PT1. In Step S110, the power sourcing equipment 110 may first complete power activation for the powered device 120 based on the Power over Ethernet standard (for example, IEEE standard 802.3af/at/bt).

In Step S120, the power sourcing equipment 110 sends a first packet to the powered device 120. The first packet includes the output voltage value of the Ethernet transmission port PT1 of the power sourcing equipment 110. In Step S130, the powered device 120 measures the input voltage value and the input current value of the powered device 120. In Step S140, the powered device 120 calculates the power loss between the power sourcing equipment 110 and the powered device 120 according to a voltage difference value between the output voltage value of the power sourcing equipment 110 and the input voltage value of the powered device 120, and the input current value of the powered device 120.

The implementation details of Steps S120 to S140 have been clearly explained in the embodiment of FIG. 1 and will not be repeated here.

Figure 6:
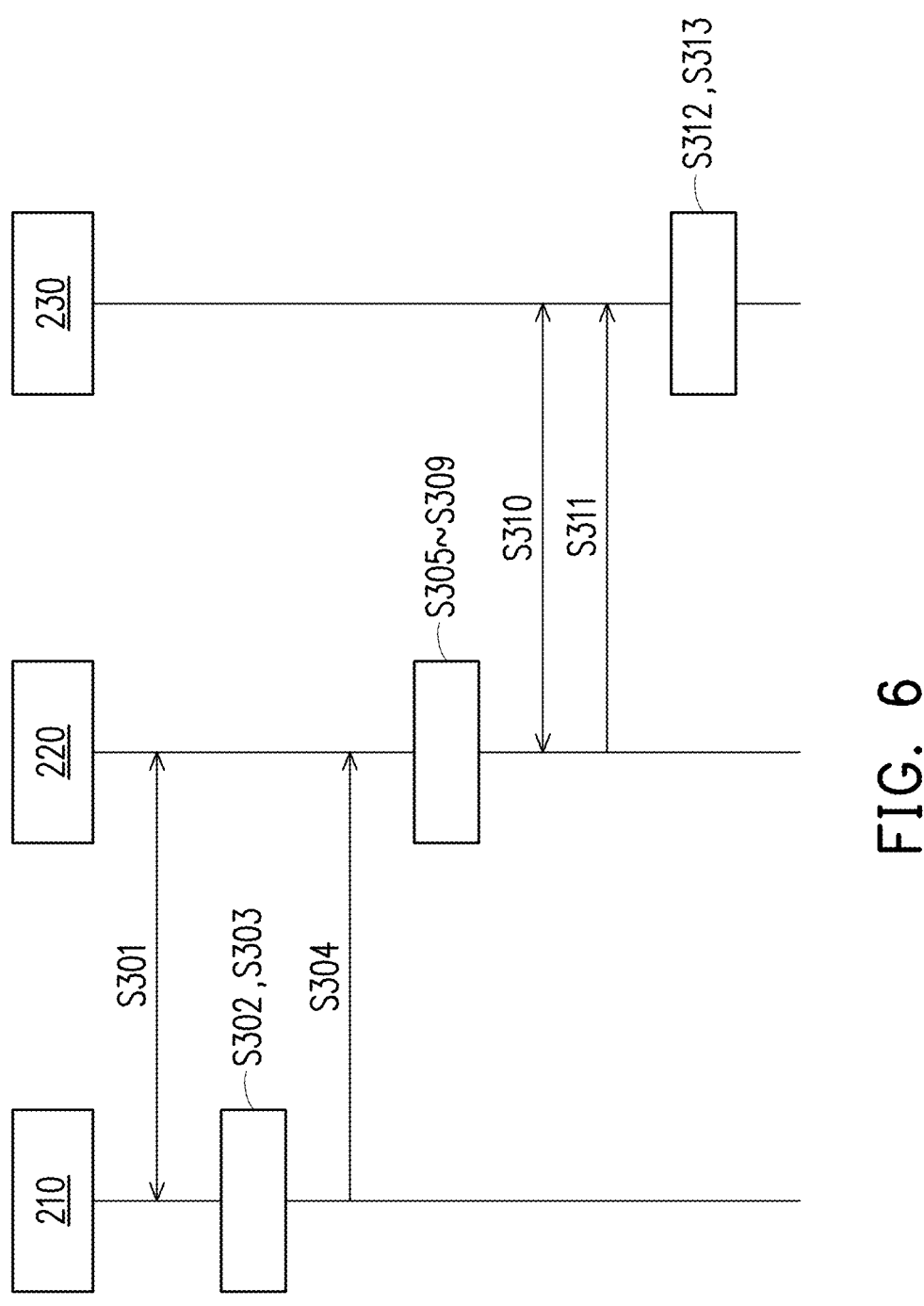
FIG. 6 is a schematic diagram of an operation according to an embodiment of the disclosure.

FIG. 5A and FIG. 5B are flowcharts of an operating method according to an embodiment of the disclosure. FIG. 6 is a schematic diagram of an operation according to an embodiment of the disclosure. In the embodiment, an operating method S300 may be applicable to the Power over Ethernet systems 200 in FIGS. 2 and 300 in FIG. 3. The Power over Ethernet system 200 will be taken as an example for explanation in the following description. The operating method S300 includes Steps S301 to S312. In Step S301, the power sourcing equipment 210 and the powered device 220 are connected. The power sourcing equipment 210 may first complete power activation for the powered device 220 based on the Power over Ethernet standard (for example, IEEE standard 802.3af/at/bt).

In Step S302, the power sourcing equipment 210 calculates the maximum allowable power value providable to the powered device 220, and obtains the output voltage value of the Ethernet transmission port PT1 of the power sourcing equipment 210 (that is, the output voltage value to be provided to the powered device 220).

In Step S303, the power sourcing equipment 210 compares the values of the maximum allowable power value providable to the powered device 220 and the output voltage value of the Ethernet transmission port PT1 with corresponding thresholds. When the maximum allowable power value providable to the powered device 220 is determined to be lower than the first threshold and/or the output voltage value of the first Ethernet transmission port PT1 is determined to be lower than the second threshold, the controller 211 stops sending the first packet, and ends the operating method S300.

On the other hand, in Step S303, when the maximum allowable power value providable to the powered device 220 is determined to be higher than or equal to the first threshold, and the output voltage value of the Ethernet transmission port PT1 is determined to be higher than or equal to the second threshold, the power sourcing equipment 210 sends the first packet to the powered device 220 in Step S304. The first packet includes the output voltage value of the Ethernet transmission port PT1 and the maximum allowable power value providable to the powered device 220.

In Step S305, the powered device 220 measures the input voltage value and the input current value received by the powered device 220. In Step S306, the powered device 220 calculates the power loss between the power sourcing equipment 210 and the powered device 220.

Next, the powered device 220 determines whether the powered device 220 has PSE function which can provide a power to a next-level powered device in Step S307. When the powered device 220 does not have the PSE function, the operating method S300 ends. On the other hand, when the powered device 220 has PSE function, the powered device 220 calculates the maximum allowable power value providable to the powered device 230 (that is, the next-level powered device) and the output voltage value of the Ethernet transmission port PT3 of the powered device 220 (that is, the output voltage value to be provided to the powered device 230) in Step S308.

In Step S309, the powered device 220 compares the maximum allowable power value providable to the powered device 230 and the output voltage value of the Ethernet transmission port PT3 with corresponding thresholds. When the maximum allowable power value providable to the powered device 230 is determined to be lower than a third threshold and/or the output voltage value of the Ethernet transmission port PT3 is determined to be lower than a fourth threshold, the powered device 220 stops sending the second packet, and ends the operating method S300.

On the other hand, when the maximum allowable power value providable to the powered device 230 is determined to be higher than or equal to the third threshold and the output voltage value of the Ethernet transmission port PT3 is determined to be higher than or equal to the fourth threshold, Step S310 may be operated. In Step S310, the powered device 220 and the powered device 230 are connected. Similar to Step S301 above, the powered device 220 may first complete power activation for the powered device 230 based on the Power over Ethernet standard (for example, IEEE standard 802.3af/at/bt). Then, the powered device 220 sends the second packet to the powered device 230 in Step S311. The second packet includes the output voltage value provided to the Ethernet transmission port PT3 of the powered device 230 and the maximum allowable power value providable to the powered device 230.

In Step S312, the powered device 230 measures the input voltage value and the input current value received by the powered device 230. In Step S313, the powered device 230 calculates a power loss between the powered device 220 and the powered device 230, and ends the operating method S300.

In an embodiment, the first packet and the second packet are multicast packets or broadcast packets. The power sourcing equipment (for example, the power sourcing equipment 210 or the power sourcing equipment 310) and the powered device having PSE function (for example, the powered device 220, the powered device 320, the powered device 330, or the powered device 340) periodically send the multicast packet or the broadcast packet to the next-level powered device, such as Steps S302, S303, and S304 and S308, S309, and S311 of the operating method. The next-level powered device may re-calculate the allowable power value according to the content of the received multicast packet or broadcast packet to limit its power loading. The multicast packet or the broadcast packet includes the output voltage value of the Ethernet transmission port of the power sourcing equipment or the powered device coupled to the next-level powered device and the maximum allowable power value allowed to be used by the next-level powered device.

In summary, the powered device can accurately calculate the actually allowable power value of the powered device and the power loss of the Power over Ethernet system. Therefore, the Power over Ethernet system and the operating method can obtain the accurate power consumption. In addition, the Power over Ethernet system may determine or design the allowable cable length between the power sourcing equipment and the powered devices and the number of cascaded powered devices based on the power loss.

Although the disclosure has been disclosed in the above embodiments, the embodiments are not intended to limit the disclosure. A person having ordinary skill in the art may make some changes and modifications without departing from the spirit and scope of the disclosure. Therefore, the protection scope of the disclosure shall be defined by the appended claims.

What is claimed is:

1. A powered device for Power over Ethernet, comprising:
a first Ethernet transmission port, coupled to a power sourcing equipment and configured to receive a first power and a first packet from the power sourcing equipment, wherein the first packet comprises a first output voltage value and a first maximum allowable power value;
a second Ethernet transmission port, coupled to a next-level powered device and configured to provide a second power to the next-level powered device;
a power meter, configured to measure a first input voltage value and a first input current value of the powered device; and
a controller, configured to send a second packet to the next-level powered device via the second Ethernet transmission port, wherein the second packet comprises a second output voltage value and a second maximum allowable power value.

2. The powered device according to claim 1, wherein the controller is further configured to subtract the first input voltage value from the first output voltage value to obtain a voltage difference value, and multiply the voltage difference value by the first input current value to obtain a power loss.

3. The powered device according to claim 1, wherein:
the controller is further configured to calculate the second maximum allowable power value providable to the next-level powered device and obtain the second output voltage value; and
when the second maximum allowable power value is higher than or equal to a first threshold and the second output voltage value is higher than or equal to a second threshold, the controller sends the second packet to the next-level powered device.

4. The powered device according to claim 3, wherein when the second maximum allowable power value is lower than the first threshold and/or the second output voltage value is lower than the second threshold, the controller stops sending the second packet.

5. A Power over Ethernet system, comprising:
a power sourcing equipment, comprising:
a first Ethernet transmission port; and
a first controller, coupled to the first Ethernet transmission port and configured to provide a power and send a first packet via the first Ethernet transmission port, wherein the first packet comprises an output voltage value and a maximum allowable power value; and
a powered device, comprising:
a second Ethernet transmission port, coupled to the first Ethernet transmission port and configured to receive the power and the first packet;
a power meter, configured to measure an input voltage value and an input current value of the powered device; and
a second controller, coupled to the second Ethernet transmission port and the power meter, and configured to obtain an allowable power value of the powered device according to the output voltage value, the input voltage value, and the maximum allowable power value.

6. The Power over Ethernet system according to claim 5, wherein the second controller is further configured to subtract the input voltage value from the output voltage value to obtain a voltage difference value, and multiply the voltage difference value by the input current value to obtain a power loss.

7. The power over Ethernet system according to claim 6, wherein:
the second controller is further configured to subtract the power loss from the maximum allowable power value to obtain the allowable power value of the powered device.

8. The power over Ethernet system according to claim 6, wherein:
the first controller is further configured to calculate a maximum allowable power value providable to the powered device and obtain the output voltage value at the first Ethernet transmission port, and
when the maximum allowable power value is higher than or equal to a first threshold and the output voltage value is higher than or equal to a second threshold, the first controller sends the first packet to the powered device.

9. The Power over Ethernet system according to claim 8, wherein when the maximum allowable power value is lower than the first threshold and/or the output voltage value is lower than the second threshold, the first controller stops sending the first packet.

10. An operating method for a Power over Ethernet system, wherein the Power over Ethernet system comprises a power sourcing equipment and a powered device, the operating method comprising:

sending, by the power sourcing equipment, a first power and a first packet to the powered device, wherein the first packet comprises a first output voltage value and a first maximum allowable power value;

measuring, by the powered device, an input voltage value and an input current value of the powered device; and obtaining, by the powered device, an allowable power value of the powered device according to the first output voltage value, the input voltage value, and the maximum allowable power value.

11. The operating method according to claim 10, further comprising:

subtracting, by the powered device, the input voltage value from the first output voltage value to obtain a voltage difference value, and multiplying, by the powered device, the voltage difference value by the input current value to obtain a power loss.

12. The operating method according to claim 10, wherein sending the first packet by the power sourcing equipment comprises:

calculating, by the power sourcing equipment, the first maximum allowable power value providable to the powered device and obtaining the first output voltage value;

sending, by the power sourcing equipment, the first packet to the powered device when the first maximum allowable power value is higher than or equal to a first threshold and the first output voltage value is higher than or equal to a second threshold.

13. The operating method according to claim 12, further comprising:

stop sending, by the power sourcing equipment, the first packet when the first maximum allowable power value is lower than the first threshold and/or the first output voltage value is lower than the second threshold.

14. The operating method according to claim 10, wherein the first packet is a multicast packet or a broadcast packet.

15. The operating method according to claim 10, wherein the Power over Ethernet system further comprises a next-level powered device, the operating method further comprising:

sending, by the powered device, a second power to the next-level powered device; and sending, by the powered device, a second packet to the next-level powered device, wherein the second packet comprises a second output voltage value and a second maximum allowable power value.

16. The operating method according to claim 15, wherein sending the second packet by the powered device comprises:

calculating, by the powered device, the second maximum allowable power value providable to the next-level powered device and obtaining the second output voltage value;

sending, by the powered device, the second packet to the next-level powered device when the second maximum allowable power value is higher than or equal to a third threshold and the second output voltage value is higher than or equal to a fourth threshold.

17. The operating method according to claim 16, further comprising:

stop sending, by the powered device, the second packet when the second maximum allowable power value is lower than the third threshold and/or the second output voltage value is lower than the fourth threshold.

18. The operating method according to claim 15, wherein the second packet is a multicast packet or a broadcast packet.

* * * * *